US009602466B2

(12) United States Patent
Dimitrakos et al.

(10) Patent No.: US 9,602,466 B2
(45) Date of Patent: Mar. 21, 2017

(54) METHOD AND APPARATUS FOR SECURING A COMPUTER

(71) Applicant: BRITISH TELECOMMUNICATIONS public limited company, London (GB)

(72) Inventors: Theo Dimitrakos, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/356,285

(22) PCT Filed: Nov. 2, 2012

(86) PCT No.: PCT/GB2012/000827
§ 371 (c)(1),
(2) Date: May 5, 2014

(87) PCT Pub. No.: WO2013/064799
PCT Pub. Date: May 10, 2013

(65) Prior Publication Data
US 2014/0289864 A1    Sep. 25, 2014

(30) Foreign Application Priority Data

Nov. 4, 2011 (EP) .................................... 11250884

(51) Int. Cl.
*G06F 7/04* (2006.01)
*H04L 29/06* (2006.01)
(Continued)

(52) U.S. Cl.
CPC ............ *H04L 63/02* (2013.01); *G06F 21/121* (2013.01); *G06F 21/53* (2013.01); *G06F 21/572* (2013.01); *G06F 21/575* (2013.01)

(58) Field of Classification Search
CPC ..... H04L 63/02; G06F 21/121; G06F 21/572; G06F 21/53; G06F 21/575
(Continued)

(56) References Cited

U.S. PATENT DOCUMENTS

2004/0098715 A1* 5/2004 Aghera ...................... G06F 8/65
717/173
2005/0256957 A1* 11/2005 Shay .................... H04L 63/1433
709/225
(Continued)

FOREIGN PATENT DOCUMENTS

EP    2 204 754 A1    7/2010
EP    2 214 114       8/2010
(Continued)

OTHER PUBLICATIONS

EP Search Report for EP Application 11250884.1, dated Mar. 4, 2012.
(Continued)

Primary Examiner — Mohammad W Reza
(74) Attorney, Agent, or Firm — Nixon & Vanderhye P.C.

(57) ABSTRACT

A computer system (100) is arranged to run at east one user-oriented operating system (153) (e.g. Windows, LINUX, etc.) on which a plurality of user-oriented applications (152) (e.g. Word processor, web browser, spreadsheet application, etc.) may run, the computer system being further arranged to run a secondary program supporting environment (154), (155) (e.g. computer BIOS, Hypervisor, basic LINUX operating system micro-kernel, etc.). The computer system (100) is arranged to run the secondary program supporting environment (154), when the main user-oriented operating system is not miming in either or both of the following situations: prior to loading the main operating system at boot-up time of the system or when a user wishes to log back into his/her operating system after
(Continued)

having previously logged out or having been logged out automatically and/or during a sleep mode of the computer system. The computer system (100) is arranged to run within the secondary program supporting environment an agent program or programs (157), (158) which are operable to communicate with one or more remote servers (300) to obtain security patches associated with the user-oriented operating system and/or the user-oriented applications.

6 Claims, 3 Drawing Sheets

(51) Int. Cl.
  *G06F 21/53* (2013.01)
  *G06F 21/57* (2013.01)
  *G06F 21/12* (2013.01)
(58) Field of Classification Search
  USPC .......................................................... 726/26
  See application file for complete search history.

(56) References Cited

U.S. PATENT DOCUMENTS

| | | | |
|---|---|---|---|
| 2005/0257206 A1 | 11/2005 | Semerdzhiev | |
| 2006/0075001 A1* | 4/2006 | Canning | G06F 8/65 |
| 2007/0006294 A1 | 1/2007 | Hunter | |
| 2007/0088948 A1* | 4/2007 | Ji | H04L 63/102 |
| | | | 713/166 |
| 2007/0282757 A1 | 12/2007 | Pandya et al. | |
| 2008/0040790 A1 | 2/2008 | Kuo | |
| 2008/0077986 A1 | 3/2008 | Rivera et al. | |
| 2008/0320466 A1* | 12/2008 | Dias | G06F 8/61 |
| | | | 717/171 |
| 2009/0100420 A1 | 4/2009 | Sapuntzakis et al. | |
| 2009/0205045 A1* | 8/2009 | Horvath | G06F 21/575 |
| | | | 726/23 |
| 2010/0050244 A1 | 2/2010 | Tarkhanyan et al. | |
| 2010/0088525 A1 | 4/2010 | Ureche et al. | |
| 2010/0174913 A1 | 7/2010 | Johnson et al. | |
| 2010/0287290 A1 | 11/2010 | Bramley et al. | |
| 2011/0138469 A1* | 6/2011 | Ye | G06F 21/577 |
| | | | 726/25 |
| 2011/0237234 A1 | 9/2011 | Kotani et al. | |

FOREIGN PATENT DOCUMENTS

| | | |
|---|---|---|
| EP | 2 339 494 | 6/2011 |
| WO | WO 2008/124560 | 10/2008 |

OTHER PUBLICATIONS

Int'l. Search Report for PCT/GB2012/000827, mailed Jun. 12, 2013.
Written Opinion of the International Searching Authority for PCT/GB2012/000827, mailed Jun. 12, 2013.

* cited by examiner

METHOD AND APPARATUS FOR SECURING A COMPUTER

This application is the U.S. national phase of International Application No. PCT/GB2012/000827, filed 2 Nov. 2012, which designated the U.S. and claims priority to EP Application No. 11250884.1, filed 4 Nov. 2011, the entire contents of each of which are hereby incorporated by reference.

FIELD OF THE INVENTION

The present invention relates to a method and apparatus for securing a computer.

BACKGROUND TO THE INVENTION

Typically modern computers use complex operating systems and run complex applications all of which may include vulnerabilities capable of being exploited by malicious users for malicious purposes. Whenever a new vulnerability within an operating system or application program is detected, the organisation responsible for the affected program usually prepares a "patch" for the program in question and offers the patch to the user for downloading and updating of his/her system. For the user's convenience, the relevant program (e.g. an operating system or an application) is often initially provided with an automatic updating facility (which forms a part of the program itself) which automatically contacts a remote server itself (usually either periodically or each time the program is run) to check to see if there are any "updates" available and if there are any found, it either automatically downloads and "installs" the patches itself without any user interaction or it notifies the user that updates are available and offers the user the option to initiate a download and install of the new available updates.

This approach generally works well. However, for very virulent malware, there is a risk that a vulnerability could be exploited before a suitable patch for the vulnerability is installed onto a user's system, even if the organisation responsible for the software in question has managed to build and make available for download a suitable patch. This could be either because the user has set his system to only look for patches either relatively infrequently or only on a manual basis (i.e. only when explicitly instructed to do so by the user). However, there is also a risk that a very virulent malware program could exploit a vulnerability even while the patch to repair the vulnerability being exploited is being downloaded and installed (since the download and install takes a finite amount of time itself).

What is more, since in order to download a patch it is generally necessary for the user's computer system to be connected to the Internet (as most updates are delivered over the Internet), there is a risk of a piece of malware being inadvertently downloaded from the Internet even while an update is being downloaded.

US 2009/0100420 describes an automated approach (and associated system and method) of updating, testing and distributing virtual machine images. A central repository holds many different virtual images for download by multiple client devices and periodically boots up each image and updates it as necessary and tests it before again storing the image ready for subsequent download by a client device. Updating or patching of each image is only performed once the virtual image is booted up and running and connected to the Internet so that it can download and apply any necessary patches in the normal manner.

US 2005/0257206 describes a system and method for updating an update module. The problem which this invention addresses is that a conventional update program cannot update itself because its own executable files are locked by conventional operating systems when they are in use, so while the updater is running it cannot update its own executable files. To overcome this problem the invention provides a two part updater comprising a bootstrap-updater part and an installation-updater part. The installation-updater part is operable to update all applications (including the bootstrap-updater part which does not run at the same time as the installation-updater part) apart from itself, while the bootstrap-updater part is operable to update the installation-updater part (which also does not run while the bootstrap-updater part is running). In this way, all applications on the system including the updater can be updated.

US 2011/0237234 describes a system suitable for use in an automobile in which a client device includes several virtual machines each of which is controlled by a virtual machine manager, wherein certain nodes running, within the client device are protected from accessing external databases directly and all communications to remote servers are handled instead by one of the virtual machines (with different virtual machines handling connections to different remote servers). The virtual machines act as buffers to prevent any risk of corruption of the nodes from external sources instead of allowing the nodes to do this themselves directly.

WO 2008/124560 describes a technology extension within a virtual environment such as a virtual corporate workstation, which may be remotely managed by a corporate IT administrator, which allows software which is running within the virtual environment and may therefore be managed by the corporate IT administrators, to have secured access to update, extend or otherwise change the behaviour of software that is running on an unmanaged host computer, which is associated with or is providing the virtual environment.

EP 2 239 494 Describes a method of performing a modular boot firmware update (where boot firmware may for example be a BIOS or an EFI). In the method, the computer is arranged to look for an updated boot firmware module on boot up and to run the updated boot firmware module rather than the old boot firmware module which it supersedes where it finds both an old and an updated boot firmware module at boot up time.

EP 2 214 114 describes a method of extending secure management of file attribute information to virtual hard disks (as opposed to non-virtual hard disks).

SUMMARY OF THE INVENTION

According to a first aspect of the present invention, there is provided a computer system arranged to run at least one main, user-oriented operating system (e.g. Windows, LINUX, etc.) on which a plurality of user-oriented applications (e.g. Word processor, web browser, spreadsheet application, etc.) may run, the computer system being further arranged to run a secondary program supporting environment (e.g. computer BIOS, Hypervisor, basic LINUX operating system micro-kernel, etc.); wherein the computer system is arranged to run the secondary program supporting environment when the main, user-oriented operating system is not running in either or both of the following situations: prior to loading the main, user-oriented operating system at boot-up time of the system or when a user wishes to log back into his/her operating system after having previously logged out or having been logged out automatically and/or during a sleep mode of the computer system; wherein the computer system is arranged to run within the secondary program supporting environment an agent program or programs operable to communicate with one or more remote servers to obtain security patches associated with the user-oriented operating system and/or the user-oriented applications and wherein the computer system is operable to apply any security patches obtained by the agent program or programs prior to the main, user-oriented operating system setting up a network connection (especially a network connection to the Internet) or at least prior to permitting certain specified user-oriented applications running on the main, user-oriented operating system, such as a web browser, from using a network connection.

Two distinct types of patches may be obtained—a first type of patch may be of the normal update type which modifies the operation of a program either by completely replacing a program (or a part of a program) or by modifying a program (or part of a program) in some way. Such update patches are typically downloadable via the Internet from the web site of the organisation responsible for the program in question. With such patches, the agent or agents running on the secondary program supporting environment are preferably operable to obtain the patches and then to store the patches in a memory to which the user-oriented operating system has access; the computer system is then preferably further operable to cause the stored patches to be applied when the user-oriented operating system is running. Preferably the patches (having been obtained and stored under the control of the agent or agents running in the secondary program supporting environment) are applied by a program or programs (e.g. as part of the main user operating system) running on the main user-oriented operating system before the user is permitted to cause a network connection to be established to, for example, a web server belonging to a third party; etc. A second distinct type of patch which may be obtained by the agent or agents running in the secondary program supporting environment may be of a micro-filter type which inspects packets of data in transition to and from the storage, network or memory devices and simply blocks and then either safely stores or discards any packets which match with a pattern specified by the micro-filter patch (in order to block potentially malicious packets containing data which could potentially cause a vulnerability to be exploited). Such micro-filter type patches can be "installed" within a suitable program running in the secondary program supporting environment which in such a case continues to run even when the main user-oriented operating system is also running. In a preferred embodiment, the system may obtain some micro-filter patches and some normal update patches which both address the same vulnerability with the micro-filter patch providing protection against exploitation of the vulnerability from a time prior to the user oriented operating system being initiated and right up until completion of the update (via the normal update patch(es)) of the affected program associated with the main user-oriented operating system.

Note that although it is important to the present invention that the secondary program supporting environment should run at times when the main user-oriented operating system is not running, it may in some cases (as referred to above for example) be possible and advantageous for the secondary program supporting environment to continue to run even while the main user-oriented operating system is running. This can be beneficial for example when, as mentioned above, the secondary program supporting environment is running a security patch in the form of a filter which filters out packets of data received from the network (via a network card configured to pass all incoming packets through a filter program running on the secondary program supporting environment) which are specified as being potentially malicious—this is discussed in greater detail below.

Preferably, the agent or agents are operable to authenticate a user who wishes to log into the user oriented operating system (or one of the user oriented operating systems where the computer has more than one of these—e.g. because the device is shared by a number of different users). In such a case the agent or agents are preferably able to then proceed to authenticate the user to the user oriented operating system to prevent the user from having to effectively "log-on" twice. In this case, the agent or agents are preferably further able to decrypt the hard drive of the computer (or at least the part of the hard drive pertinent to the authenticated user) so that only authenticated users can access data on the hard drive and only authenticated users can initiate a user-oriented operating system and associated applications on the computer device.

Preferably, the agent or agents comprise two agents hereinafter referred to as "Agent A" and "Agent B". Preferably Agent A is operable to perform user authentication functions and encryption and decryption functions, whilst Agent B is operable to perform remote access functions—e.g. obtaining appropriate patches from a remote secure web server—and to maintain details about the user oriented operating system and the applications running thereon and details about the extent to which they have been updated or patched, etc. (i.e. details of the patch download and installation history and their current versions and status details etc.).

In some situations (e.g. corporate environments in which the users of a computer device are corporate employees but an IT administration department has responsibility for maintaining the security of the computer devices) it may be advantageous for the agents to be controllable/configurable by a system administrator (which is another entity to the normal device user) rather than the normal device user. In such a situation the system administrator can be thought of as having control over the secondary program supporting environment and the programs running therein. Since this operates at a more basic layer in the hierarchy of programs running on the device the administrator has a more basic control over the device which can be useful in the event of any security problems on the device. Moreover, since, as mentioned above, the secondary program supporting environment can be a much simpler environment than a modern fully fledged user oriented operating system with a number of possibly specialist, possibly third party applications running thereon, it is much easier to make the secondary program supporting environment and the programs running thereon robust and secure against malicious attacks such that even if the (or a) user-oriented operating system or a program running thereon becomes compromised by a malicious attack or for some other reason (e.g. some sort of software conflict or by virtue of operations (possibly performed by mistake) carried out by the normal user of the device) it is very likely that the secondary program supporting environment will be unaffected and there is therefore an improved possibility of recovering the device to an uncompromised state via the secondary program supporting environment.

There are a number of different ways in which the invention may be put into practice, each having its associated advantages and disadvantages etc. Some of these options and their associated merits and demerits will be discussed briefly now. Most of the different possibilities relate to the nature of the secondary program supporting environment which possibilities include i) the BIOS (Basic Input Output System) or an alternative boot firmware system or program such as one conforming to the Extensible Firmware Interface (EFI) standard; ii) a hypervisor layer or some sort of virtual machine manager or an operating system within which the hypervisor layer is itself running; or iii) a special purpose operating system such as a basic LINUX operating system.

The benefit of option i) is that it is efficient to introduce into a standard computing device since they always already have a BIOS (or other boot firmware program) which can be modified (by a skilled BIOS (or similar) programmer) to perform additional functionality including all of the functionality required to implement the present invention and preferred aspects thereof such as the micro-filter patch implementation. The disadvantage is that it is difficult to implement such functionality without being a skilled boot firmware programmer and these are few and far between. As such it would be a preferred implementation for implementation by a boot firmware manufacturer company such as Phoenix Technologies having the necessary expertise.

The benefit of option ii) is that the use of virtualisation techniques is becoming ever more and more important and popular; moreover, such an implementation is relatively easy to implement either by a virtualisation company such as VMware or by a general programmer having access to the source code of such a tool, etc.; furthermore, it is particularly appropriate for use in situations where a single device has a number of different users (or a single user performing a number of different roles which are suited to different "desktops" with different functionalities, etc.); and finally it is easy to implement features such as the micro-filter implementation of filtering patches, etc as it is easy to intercept all traffic going to or from the guest operating system, regardless of the source or destination of the data (e.g. to or from a network connecting external devices, or even just to or from a locally connected storage device). The specific embodiment described in detail below falls within option ii) (perhaps option ii.b)) but for ease of implementation the functionality pertinent to the present invention is included not within the hypervisor layer itself but as a set of programs running in the same operating system within which the hypervisor itself is running—this has been done simply for ease of implementation and it should be understood that in preferred embodiments it would be preferable to include much of the described functionality within the hypervisor layer itself (and this is discussed below in the discussion of the specific embodiment).

The main benefit of option iii) is simply the ease of its implementation. However, although very simple to implement a very basic form of the present invention it would be more difficult to incorporate many of the more advanced preferred features of the present invention such as removing the need for users to perform two separate log-on authentication steps or implementing micro-filter patches, etc.

Further aspects of the present invention relate to a corresponding method of operation of a computer device and to computer programs for carrying out such a method (or for implementing a computer system according to the first aspect) and to a carrier medium for carrying such programs, preferably a non-transient carrier medium such as a magnetic or optical storage device such as a hard disk or a CD ROM or a DVD, etc, or a solid-state storage device such as dynamic memory, or non-volatile memory such as a memory stick, etc.

BRIEF DESCRIPTION OF THE FIGURES

In order that the present invention may be better understood, embodiments thereof will now be described, by way of example only, with reference to the accompanying figures in which.

FIRST EMBODIMENT

As has been mentioned above, there are numerous ways in which the present invention may be embodied. Merely as one example, a particularly straightforward implementation of the present invention will now be described in detail, with reference to FIGS. 1, 2 and 3.

Figure 1:
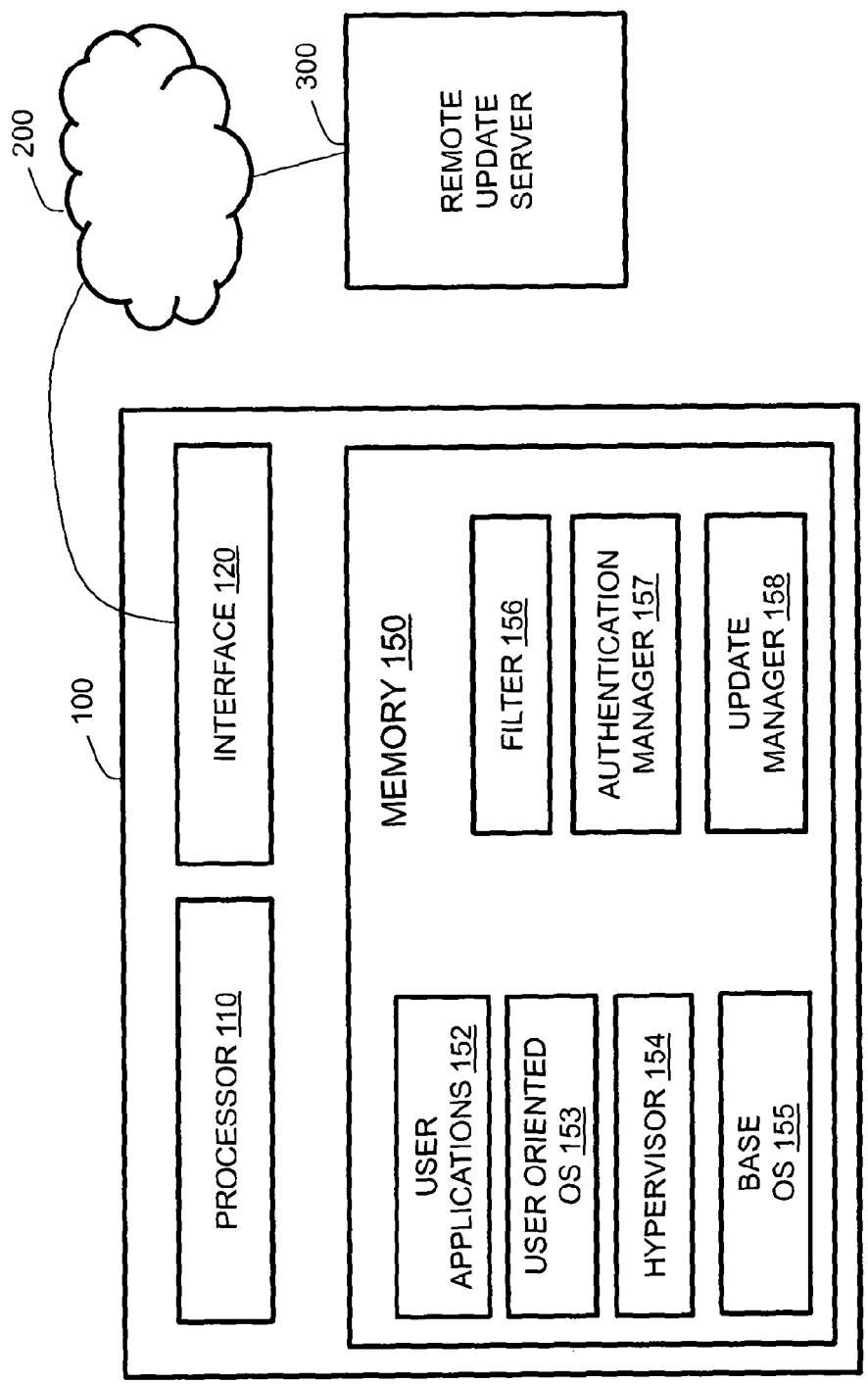
FIG. 1 is a schematic representation of an embodiment of the present invention.

Thus, referring firstly to FIG. 1, a first embodiment of the present invention comprises a computer device 100 comprising a processor unit 110, an interface 120 and a memory 150. The computer device is connected via the interface 120 and the Internet 200 to a remote server 300 which stores various data items including user profiles and program updates and patches as discussed in greater detail below. The memory 150 comprises various software modules which cause the device 100 to perform various functions as described in greater detail below. In overview, the various modules pertinent to the present invention include: user applications 152 (e.g. word processors, spreadsheet applications, web browsers, mail clients etc.), a user oriented operating system 153 (e.g. Microsoft's Windows 7, etc.), a virtual machine manager or "hypervisor" 154 (e.g. VMware Player), a base operating system 155 (e.g. Linux), a Filter module 156 (this serves to perform filter patching as discussed below), an authentication manager 157 (this is in the form of an "agent" program and acts to prevent unauthorised access to the base OS 155 by permitting only very few functions to be performed, a key one of which is to activate the update manager 158) and lastly, an update manager (also in the form of an "agent" program—this program has somewhat greater functionality than the authentication manager and is operable to obtain patches and updates etc and to control the installation of these etc. as discussed below).

Figure 2:
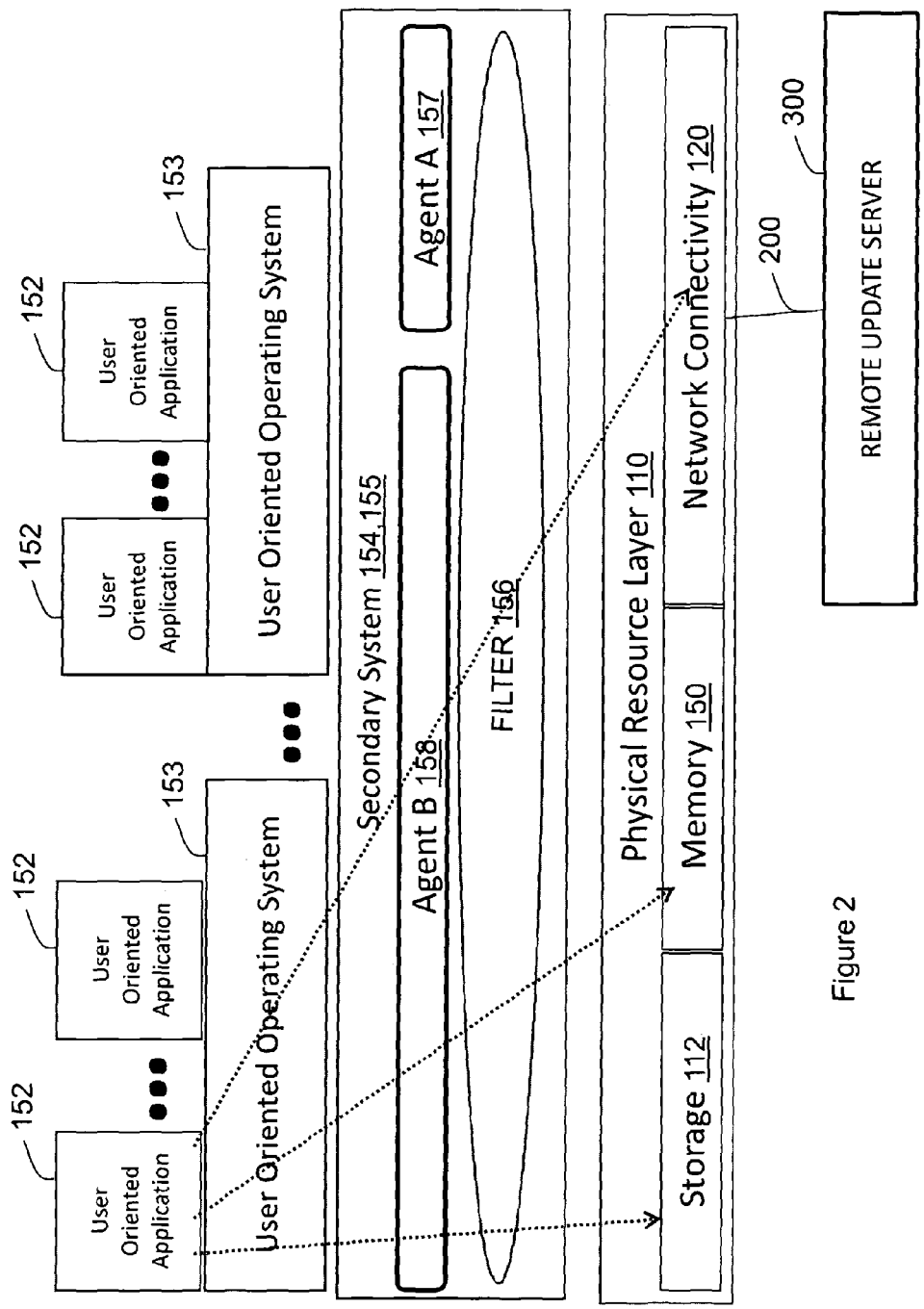
FIG. 2 is an alternative schematic representation of the embodiment of FIG. 1 emphasising the hierarchical structure of the embodiment.

FIG. 2 is an alternative schematic representation of the embodiment of FIG. 1 showing how the various components can be thought of as operating at different layers, with, in general, each layer apart from the lowest, physical device layer, using the facilities of the layer immediately below it. In this representation it can be seen that the highest layer components are the user applications 152 which run using the services provided by a user oriented operating system 153. Note that the system can include more than one user oriented operating system and each user oriented operating system can include a multiplicity of user applications 152. The or each user oriented operating system is run as a guest operating system within a virtual machine manager 154 (such as a VMware Player application—not shown separately in FIG. 2) which itself runs within a secondary program supporting environment 154 in the form (in the present invention) of a Linux operating system. Also illustrated as being contained within the secondary program supporting environment 155 in FIG. 2 are an Agent A 157 (the authentication manger 157 of FIG. 1) and an Agent B 158 (the update manager 158 of FIG. 1) and the filter 156. The lowest layer (beneath the secondary program supporting environment 155) is a physical resources layer 120 which is illustrated as comprising storage 112 (e.g. a hard drive), memory 150 and a network connectivity module 120 (illustrated as the interface 120 in FIG. 1).

Figure 3:
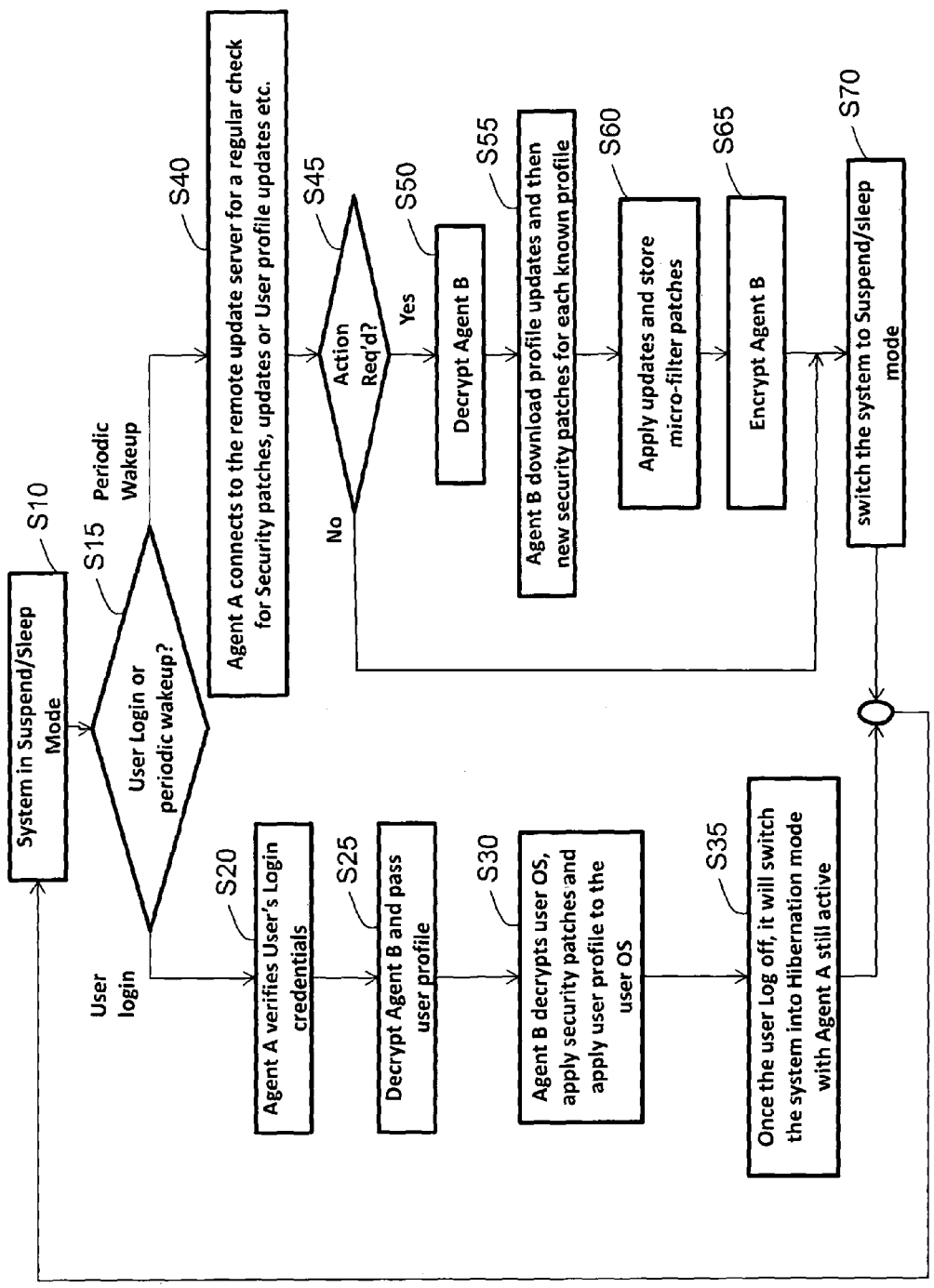
FIG. 3 is a flow chart illustrating an example method of operation of the embodiment of FIGS. 1 and 2.

In terms of the operation of the system, an overview will firstly be presented followed by a closer examination of the steps involved with reference to FIG. 3. The overall aim of the system is to provide a secure mechanism for receiving updates and patches to a computer device (especially a computer device within a typical corporate environment in which the user of the device is an employee but the device itself belongs to the corporation/employer who has a very strong interest in avoiding malware from infecting a user's device since the level of trust necessarily ascribed to corporate owned devices used by employees as a tool for carrying out the business of the employer is high and such devices have great potential to inflict huge damage on a corporation's internal network of computing devices because such devices are typically allowed to operate inside the corporation's firewall). In addition the system of the present embodiment provides an additional layer of separation between the user's operating system and associated user applications (which should be considered as most at risk of attack because they are complex and largely under the control of third parties, etc.) and the actual hardware or physical layer of the device, which increases the, possibilities of a system administrator for a device being able to mitigate the adverse affects of a malware attack on the device.

In the present embodiment, this additional layer is provided by a Linux operating system on which a number of programs which are specific to the purposes of the present invention are run, together with a virtual machine manager (in particular in the present embodiment a VMware Player application though any of a number of alternative virtual machine managers/desktop hypervisor applications could be used instead) are run. The use of a Linux operating system is beneficial because it is relatively immune to malware attacks and because it is a well understood operating system whose behaviour is predictable and well understood owing to the open source nature of the operating system. However alternative operating systems could be used for the secondary program supporting environment and still obtain significant security benefits because the access to the operating system can be well controlled by providing only very limited functionality to programs running on that operating system. In addition very little functionality is required of the base operating system and so relatively simple and thus robust operating systems can be used.

The programs which are specific to the present invention and which are run at the secondary program supporting environment are a first agent (Agent A 157) which is active at all times that the device is on, a second agent (Agent B 158) which is only activated by Agent A as and when Agent B is required to perform some task which it (but not Agent A) is designed to perform and a packet filter program (156). The system is configured such then when the user decides to finish using the device and "switch it off" the user (guest) operating system is closed down and it's state is saved in the standard manner for doing this in respect of guest operating systems running within a virtual machine manager such as VMware Player (e.g. as a "snapshot"), and then the device falls back to the secondary program supporting environment which in the present embodiment is a Linux operating system. When in this background operation mode the display is switched off such that it appears to the user as though the device is off. Within the Linux operating system Agent A is running and will monitor for attempts by a user to log on (e.g. by the user pushing the power button on the device) in which case the display is switched back on and a user interface is provided to the user in which he/she can attempt to log back into the user oriented OS. The Agent A controls the interface for this operation and can authenticate the user (in the present example simply by comparing an entered username and password with a stored username and password but alternative user authentication methods such as a fingerprint recognition method could of course be used). If the user is authenticated the user oriented operating system for the authenticated user is started up as a guest operating system within the virtual machine manager (the VMware player) with imported state as saved (and encrypted) on the last exit of the operating system. In the present embodiment, this is done by the Agent A decrypting and then calling on Agent B which in turn decrypts the data associated with the authenticated user's data and OS state and then passes this to the virtual machine manager. Settings can ensure that no further authentication is required by the user in order to start working within the guest operating system as soon as it has booted up within the virtual machine manager.

Agent A is also responsible for checking with the remote secure update server 300 (typically this is associated with the corporation to which the device belongs) from time to time to ascertain if there is some significant action required on behalf of a user associated with the device or more generally in respect of the device as belonging to the corporation (e.g. for corporate or device-type wide updates). In the present embodiment the system is set to suspend operation and to re-awake on a periodic basis to permit Agent A to perform such a check on a half hour basis but this is clearly just a specific example—to perform the periodic suspension and re-awakening the present embodiment employs an Advanced Configuration and Power Interface (ACPI) Real Time Clock (RTC) Alarm function. The remote update server 300 is controlled by a system administrator of the corporation (in the present embodiment directed towards a corporate environment—in say a home user environment a similar system could be deployed in which the "administrator" is for example an Internet Service Provider who rents the device to the user, etc.). The remote update server in the present embodiment stores a user profile associated with each user within the corporation (or each user role where a single user may have more than one role requiring different computing needs, etc.). The user profile may store a number of details pertaining to the user (e.g. various access permissions, etc.) but these include in the present embodiment a list of the user applications which the user has "installed" on the device (i.e. contained within the state data belonging to the user oriented guest operating system) together with details of the "update" status of these applications and of the operating system itself. From time to time as updates or patches become available for one of these listed applications (or for the OS itself) (e.g. as provided by the (normally third party) organisation responsible for application or for the OS) the corporation owning the device will obtain these updates and patches and place them on the server for automatic download and installation by one of its devices. Whenever a new update or patch is placed on the remote update server 300 in this way the profiles of all users affected by the new update or patch is amended to reflect the fact that a new update or patch is available for that user.

When the Agent A contacts the remote update server 300 and determines that a new update or patch is available for one or more of the users (or user roles) associated with the device, it again decrypts and awakens Agent B which then contacts the remote update server and downloads the relevant updates and patches for all associated users of the device. In the present embodiment Agent B then immediately provides any microfilter type patches to the filter application 156 such that any packets matching the pattern specified in the newly downloaded patch will be blocked by the filter and not passed on to the user application for which the packet was destined. In respect of any conventional updates Agent B (sequentially for each such user or user role affected by the new updates) decrypts the status data for the affected user and causes the OS for that user to be run as a guest OS in the virtual machine manager in a special administrator mode in which no access is provided to the internet but instead the OS or any programs affected by the updates are run and allowed to install the updates in the normal fashion in which such updates are installed by the affected OS or application. This can be done in a number of ways depending on the application or OS to be updated, such as, for example, either by storing the updates in a location in which the OS or application automatically looks for such updates whenever it is initiated (e.g. in a specified folder) or by permitting the OS or application to attempt to look for updates in the normal fashion (e.g. by accessing a remote server specific to the application or OS) and intercepting such network access requests and impersonating the response of the remote server in such a way as to provide the update to the application or OS. Once the update process is completed the guest OS is closed down again and it's modified state is stored ready to be invoked next time the user attempts to log onto his/her OS. The Agent B then reports the successful update to the remote update server 300 which removes its flag for that user and updates the user profile to reflect the new status of the updated OS and/or applications. This process is repeated for each user (role) OS affected by an update. Note, in alternative embodiments, it may be possible for the updates to be applied by Agent B without having to run the guest OS at all, simply by replacing certain portions of the state data of the affected guest OS and this would be advantageous although more difficult to implement. Also note that in the present embodiment if a user attempts to log on to the system whilst an update is in progress s/he is presented with a warning on the display to the effect that an important update is in progress and that the user will be able to log in within some (generally short) specified time or at least once the update process has completed if it is not known how long the update process will take.

A possible alternative method of updating the system is to upload the state information (e.g. the "snapshot") of the user oriented guest operating system to the remote update server 300 which can perform the necessary updates itself on behalf of the device and then send back the updated state information for use by the device next time the user logs on to the guest operating system. Whilst the state information is being remotely updated the user should again be informed if s/he should attempt to log in during the time taken to upload, remotely update and download back again the updated state information the user should be advised that an important update is occurring and log in will be permitted shortly. As an alternative the user could be offered the opportunity to log on (based on a non-updated version of the state information) with limited functionality (e.g. disabling any applications which are in the process of being updated and/or disabling any access to external web-sites, etc.).

Referring now to FIG. 3, the steps performed by the first embodiment are described. It should be noted that the device is considered to always be in a sleep or suspend mode. Of course if power to the device is lost it will shut down but as soon as power is restored to the device it should return to the sleep state of step S10. At step S15 it is determined whether either a user has attempted to initiate a login (e.g. by pushing the power or sleep button etc.) or alternatively whether a wakeup for a periodic check has occurred. If it is determined that a login initiation has occurred, then the method proceeds to step A20 where Agent A attempts to authenticate the user (in the present embodiment by checking a user name and password). Assuming that the authentication is successful (recall there may be many different users or user roles associated with the device each of which will have a corresponding username and password) then the method proceeds to step S25 in which Agent A decrypts and activates Agent B and passes to Agent B details of the user which has just successfully logged on (e.g. a user identifier such as the username). The method then proceeds to step S30. (Note that if at step S20 the user cannot be verified then various typical actions can be taken such as allowing the user to make repeated attempts to log on possibly with increasing time intervals being required between permitting a further logon attempt, and providing a helpline phone number where a representative of the system administrator can offer assistance to the user etc.)

At step S30, Agent B operates to decrypt the state information of the respective user's user guest OS and passes this to the virtual machine manager to run the guest OS with which the user may then interact in the normal manner. In addition Agent B in the present embodiment ensures that the appropriate filter patches are in place on the filter program 156—in this embodiment a different set of patches is kept for each user and only the patches appropriate to the particular logged on user are set at the filter each time a user logs on. Additionally, the Agent B passes to the virtual machine manager the user profile of the logged on user which specifies security and access settings for the user etc. Once the Agent B has completed these tasks it is closed down and encrypted by Agent A. The user then continues to perform his/her tasks on the guest OS including running any applications required etc. until the user wishes to log off again. At that time the method proceeds to step S35 in which the guest OS state information is stored (e.g. as a snapshot), the virtual machine manager 154 is closed down and the device returns to a suspend/sleep mode (in which very little current is drawn) indicated by step S10.

If at step S15 it is determined that a periodic wakeup event has occurred, then the secondary program supporting environment wakes up including Agent A which then, at step S40, connects to the remote update server 300 to see if there is any kind of update or action required in respect of any of the users associated with the device, such as, for example, a new security micro-filter patch may be available to address a new found vulnerability associated with the user's OS or one of the user's applications, an update for (or entire new version of) the OS of the user or one of the user's applications, or a change to the user's profile (e.g. in terms of which functions within the OS the user is allowed to perform etc.). The method then proceeds to step S45 where it is determined whether or not any action is required as a result of the periodic check of the remote server 300 in step A45. If no action is required the method proceeds directly to step S70 in which the system returns to the suspend/sleep mode and awaits at step S10 for a login initiation request or for the next periodic wakeup.

If, however, it is determined at step S45 that some action is required then the method proceeds to step S50 in which Agent B is decrypted and activated and then the method proceeds to step S55 in which Agent B contacts the remote server 300 (in the present embodiment—note that in alternative embodiments Agent B may be permitted to directly access websites associated with the owners of the application to be updated (in respect of application or OS updates) and to directly obtain the necessary updates from those sites, etc.). Agent B then downloads all relevant updates, patches, profiles etc. for a respective user and then at step S60, Agent B co-ordinates the necessary updating of the programs involved or the taking of other appropriate actions. For example filter patches are merely stored waiting until the user next logs in whereupon Agent B will ensure that the filter 156 applies the relevant patches to block any packets of data matching the patch to avoid the possibility of malicious packets attempting to exploit a vulnerability. In respect of updates or new versions of an application or OS etc. Agent B causes, in the present embodiment, the relevant guest OS to be run within the virtual machine manager in a special admin mode in which the updates are installed and then, once the installation has completed, the new state info of the guest OS is stored and the virtual machine manager is closed down again. Once all necessary actions have thus been completed Agent B contacts the remote update server 300 to inform it of the-new status of the user's OS and applications and then it is closed down and encrypted by Agent A at step S65. Once this is completed the method proceeds to step S70 and goes back to sleep/suspend as described earlier.

In an alternative embodiment in which periodic automatic wake-ups to the base OS running the agents is not possible, when the device is switched on by a user it can firstly load up just the base OS and the Agent A running therein and then perform a check for patches and updates and if any are found it can either then obtain and apply the updates and patches directly as in the first embodiment, or it can obtain the patches and updates and then save them where they can be accessed directly by the user-oriented operating system which may have been configured to, on first boot-up, look for any patches and apply them prior to the main, user-oriented operating system setting up a network connection (especially a network connection to the Internet) or at least prior to the main user oriented operating system permitting certain specified user-oriented applications running on the main, user-oriented operating system, such as a web browser, from using a network connection. This alternative approach is less preferred because it would increase boot-up times where patches need to be obtained and applied, but this disadvantage can perhaps be mitigated to some extent by displaying a notification to the user that important security patches are being applied or some such thing. The user-oriented operating system can be controlled to restrict network action (either to the user-oriented operating system as a whole or to specific user-oriented applications) by using a script or some other program running on the user oriented operating system and configured to run automatically on boot up of the operating system with high priority.

Summary of Aspects of Certain Possible Embodiments

Embodiments provide a system and method of delivering device security policy and updates through a mechanism to a secure layer that operates below the device's operating system and can be securely shared among multiple users on the same device.

The device security policy and updates are delivered to the end system via a secure communication channel (details follow) into a dedicated security layer under the operating system, such as a dedicated chip, an extension of the device's BIOS, or part of a "thick" hypervisor deployed at the end system (PC, laptop, smart-phone, etc.).

This security layer sits under the main operating system— is preferably "always on" (for example remains on when the device is in a "sleep" or "hibernation" mode) and boots first before booting the main operating system. This security layer has at least the following functions:

1. An agent (A) that interacts with the user and verifies the user credentials.
2. Creating user partitions in a hard disk and managing encryption keys that allow encrypting the operating system, device configuration and personal applications and data that correspond to each user registered on the device.
3. A means of establishing secure connection and communication channel with the device/corporate security administrator so that it can be accessed remotely by this administrator for resetting or creating user accounts.
4. A mechanism that stores meta-data associated with the system profile for each registered user. Such data may include device built, OS version, applications installed, etc.
5. An agent (B) that establishes a secure connection with a security administration server in order to retrieve any security update required by the system even if the system is switched off.

The agent A (as above) stores the user credentials and maps it to their encryption/decryption key. Different encrypted, partitions of the hard disk or other secondary storage (e.g. "flash memory", SD card, etc) are created for each user that is registered with the device.

When a user logs-in to the system by entering his credentials at the agent level, then the agent verifies the user first and then obtains his stored secret key in order to decrypt the OS the user is using and the user's data. By doing that, then the user will be able to access the system and its resources without being able to access other user's data stored on the same system.

The agent A should be able to perform the following:
Verify user credentials and map it to stored secret key.
Able to encrypt user's data and OS once the user log-off the system.
Able to decrypt user's data and OS once log-in to the system.
Store information about the user profile such as OS he is using, last time log-in, user credentials, and user's secret key.

The agent B should be able to retrieve missing security patches and updates based on the device profile kept for each user. These may include security updates for the operating system and any other applications the user has installed on the device. Agent B can act on these either immediately (e.g. by means of a "virtual patch") or once the user logs in or by "logging in to the user's OS on behalf of the user" for the sole purpose of installing the updates. For example, if user A is using Win XP and user B is using Win 7, then even if user A is currently logged into the system and connected to the Internet, then the agent should be able to discover the missing patches and any security updates for both Win XP and win 7 and retrieve them automatically. Once user B is logged into the system, even if he is not connected to the internet, then the agent will start installing the missing patches and security updates that the agent has retrieved earlier. Extensions of this invention may introduce other security modules such as application firewalls, intrusion prevention and malware detection tools, web filters, etc., in that security layer with user-specific configurations and eliminate the need of installing such security modules on top of the device's operating system.

Note that "Virtual patch" refers to a mechanism of applying a packet inspection filter in order to protect vulnerable OS modules or applications from exploits. Applying a virtual patch at this level assumes that the underlying security layer can intercept all communications before they reach the OS of the device. This can be a typical behaviour if this underlying security layer is implemented as a module of a hypervisor upon which the device OS for the different users sit, or can be linked to the device BIOS in case of embodiments based on hardware or BIOS extension.

The invention claimed is:

1. A computer system comprising a computer hardware processor arranged to execute software so as to run at least one user-oriented operating system on which a plurality of user-oriented applications may run,
   the computer system being further arranged to run a secondary program supporting environment;
   wherein the computer system is arranged to run within the secondary program supporting environment an agent program or programs operable to communicate with one or more remote servers to obtain security patches associated with the user-oriented operating system and/or the user-oriented applications;
   wherein the computer system is configured to apply any security patches obtained by the agent program or programs prior to the user-oriented operating system setting up a network connection on boot up of the user-oriented operating system or prior to permitting certain specified user-oriented applications running on the user-oriented operating system from using a network connection; and
   wherein at least one of the security patches is applied by the agent program or programs intercepting a network access request from at least one of the user-orientated applications for a security update, the agent program or programs responding to the network access request by impersonating the response of the one or more remote servers;
   wherein the at least one of the security patches includes a filter patch arranged to block incoming packets of data which satisfy a criterion specified in the patch so that any of the incoming packets of data which satisfy the criterion is blocked by the filter patch and not passed on to the at least one of the user-orientated applications; and
   wherein the agent program or programs responds to the network access request by impersonating the response of the one or more remote servers in such a way as to provide the security update to the user-oriented operating system or at least one of the user-oriented applications.

2. A computer system according to claim 1 wherein the computer system is arranged to run the secondary program supporting environment when the main user-oriented operating system is not running in either or both of the following situations: prior to loading the main operating system at boot-up time of the system or when a user wishes to log back into his/her operating system after having previously logged out or having been logged out automatically and/or during a sleep mode of the computer system.

3. A computer system according to claim 1 wherein the secondary program supporting environment is a Basic Input Output System.

4. A computer system according to claim 1 wherein the secondary program supporting environment is an operating system which includes a virtual machine manager application which is operable to run the user oriented operating system.

5. A method of updating a computer system arranged to run, using a computer processor, at least one user-oriented operating system on which a plurality of user-oriented applications may run and a secondary program supporting environment, the updating method operating to keep the computer system protected from having vulnerabilities, in the user oriented operating system or in a user application running on the user oriented operating system, from being exploited by malware, the method comprising
   a program or programs, running within the secondary program supporting environment, communicating with one or more remote servers to obtain at least one security filter patch, the at least one security filter patch being associated with the user-oriented operating system and/or with a user-oriented application operable to run on the user-oriented operating system;
   wherein the method further comprises the computer system applying any security filter patches obtained by the agent program or programs prior to the user-oriented operating system setting up a network connection in respect of either the user-oriented operating system as a whole or in respect of a user oriented application to which an obtained filter patch applies, or at least prior to the user-oriented operating system permitting certain specified applications such as a web browser from using a network connection; and
   wherein at least one of the security filter patches is applied by the agent program or programs intercepting a network access request from at least one of the user-orientated applications for a security update, the agent program or programs responding to the network access request by impersonating the response of the one or more remote servers;
   wherein the at least one of the security filter patches is arranged to block incoming packets of data which satisfy a criterion specified in the filter patch so that any of the incoming packets of data which satisfy the criterion is blocked by the filter patch and not passed on to the at least one of the user-orientated applications; and
   wherein the agent program or programs responds to the network access request by impersonating the response of the one or more remote servers in such a way as to provide the security update to the user-oriented operating system or at least one of the user-oriented applications.

6. A non-transient computer readable carrier medium carrying a computer program or programs, which upon execution of by the computer processor, performs a method of updating a computer system arranged to run, using a computer processor, at least one user-oriented operating system on which a plurality of user-oriented applications may run and a secondary program supporting environment, the updating method operating to keep the computer system protected from having vulnerabilities, in the user oriented operating system or in a user application running on the user oriented operating system, from being exploited by malware, the method comprising a program or programs, running within the secondary program supporting environment, communicating with one or more remote servers to obtain at least one security filter patch, the at least one security filter patch being associated with the user-oriented operating system and/or with a user-oriented application operable to run on the user-oriented operating system;

wherein the method further comprises the computer system applying any security filter patches obtained by the agent program or programs prior to the user-oriented operating system setting up a network connection in respect of either the user-oriented operating system as a whole or in respect of a user oriented application to which an obtained filter patch applies, or at least prior to the user-oriented operating system permitting certain specified applications such as a web browser from using a network connection; and wherein at least one of the security filter patches is applied by the agent program or programs intercepting a network access request from at least one of the user-orientated applications for a security update, the agent program or programs responding to the network access request by impersonating the response of the one or more remote servers; and wherein the at least one of the security filter patches is arranged to block incoming packets of data which satisfy a criterion specified in the filter patch so that any of the incoming packets of data which satisfy the criterion is blocked by the filter patch and not passed on to the at least one of the user-orientated applications; and wherein the agent program or programs responds to the network access request by impersonating the response of the one or more remote servers in such a way as to provide the security update to the user-oriented operating system or at least one of the user-oriented applications.

* * * * *